US009584678B2

(12) United States Patent
Nonaka

(10) Patent No.: US 9,584,678 B2
(45) Date of Patent: Feb. 28, 2017

(54) IMAGE DATA STORING DEVICE, METHOD OF STORING IMAGE DATA AND NON-TRANSITORY COMPUTER READABLE MEDIUM STORING PROGRAM

(71) Applicant: FUJI XEROX CO., LTD., Minato-ku, Tokyo (JP)

(72) Inventor: Hiroshige Nonaka, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/604,020

(22) Filed: Jan. 23, 2015

(65) Prior Publication Data

US 2016/0050323 A1 Feb. 18, 2016

(30) Foreign Application Priority Data

Aug. 12, 2014 (JP) ................. 2014-164100

(51) Int. Cl.
*H04N 1/04* (2006.01)
*H04N 1/00* (2006.01)
*H04N 1/32* (2006.01)

(52) U.S. Cl.
CPC ..... *H04N 1/00212* (2013.01); *H04N 1/32432* (2013.01); *H04N 1/32486* (2013.01)

(58) Field of Classification Search
CPC ............ G06F 17/30749; G06F 3/1285; G06F 3/1259; G06F 17/30091; G06F 3/1258; H04N 2201/3208; H04N 2201/3216; H04N 2201/3221; H04N 2201/3226; H04N 2201/3242; H04N 5/243; H04N 1/00209

USPC ... 358/1.15, 1.13, 1.14, 403, 1.16, 474, 402, 358/407, 448, 488; 709/203, 206, 219, 709/217, 231, 213, 201, 204, 205, 222, 709/223, 245; 382/106, 274, 289
See application file for complete search history.

(56) References Cited

U.S. PATENT DOCUMENTS

| 5,235,510 | A  | * | 8/1993  | Yamada   | ............... | G06F 19/321 |
|           |    |   |         |          |                 | 128/922     |
| 5,890,173 | A  | * | 3/1999  | Yoda     | ............... | 715/209     |
| 6,336,151 | B1 | * | 1/2002  | Seki     | ............... | G06F 9/4411 |
|           |    |   |         |          |                 | 709/217     |
| 6,600,569 | B1 | * | 7/2003  | Osada    | ............... | G06F 3/1296 |
|           |    |   |         |          |                 | 358/1.1     |
| 7,751,070 | B2 | * | 7/2010  | Sato     | ............... | H04N 1/00721 |
|           |    |   |         |          |                 | 358/1.13    |
| 7,810,074 | B2 | * | 10/2010 | Yano     | ............... | G06F 21/121 |
|           |    |   |         |          |                 | 717/127     |
| 8,156,436 | B2 | * | 4/2012  | Matsutani| ............... | 715/727     |

(Continued)

FOREIGN PATENT DOCUMENTS

JP 2004-120088 A 4/2004
JP 2009-252124 A 10/2009

*Primary Examiner* — Negussie Worku
(74) *Attorney, Agent, or Firm* — Sughrue Mion, PLLC

(57) ABSTRACT

An image data storing device includes: an image data obtaining unit that obtains image data; a storing unit that stores the image data obtained by the image data obtaining unit into any one of plural storage regions, to each of which a name is assigned; a reception unit that receives the name of the storage region in which the image data is stored from external equipment, the name being obtained by the external equipment that takes the image data from the storage region, and the name being set by a user; and a memory that stores the name received by the reception unit in association with the storage region.

7 Claims, 9 Drawing Sheets

(56) References Cited

U.S. PATENT DOCUMENTS

| | | | |
|---|---|---|---|
| 8,312,110 B2* | 11/2012 | Muraki | H04L 67/2823 707/782 |
| 8,477,344 B2* | 7/2013 | Kawabuchi et al. | 358/1.15 |
| 8,633,839 B2* | 1/2014 | Takano | H03M 7/30 341/65 |
| 8,836,965 B2* | 9/2014 | Yamada | G06F 3/121 358/1.14 |
| 8,976,419 B2* | 3/2015 | Kakutani | H04N 1/00005 358/1.14 |
| 9,070,072 B2* | 6/2015 | Fukasawa | |
| 2001/0015812 A1* | 8/2001 | Sugaya | G06F 3/1204 358/1.1 |
| 2005/0154989 A1* | 7/2005 | Maddocks et al. | 715/735 |
| 2006/0041944 A1* | 2/2006 | Yano | G06F 21/51 726/27 |
| 2006/0050297 A1* | 3/2006 | Morikawa | H04N 1/32122 358/1.15 |
| 2006/0172730 A1* | 8/2006 | Matsuda | 455/420 |
| 2006/0265567 A1* | 11/2006 | Ji | G06F 3/0605 711/173 |
| 2007/0100967 A1* | 5/2007 | Smith | G06F 8/20 709/219 |
| 2008/0151330 A1* | 6/2008 | Takahata | H04N 1/00352 358/497 |
| 2009/0187758 A1* | 7/2009 | Fujii | G06F 21/608 713/153 |
| 2009/0260063 A1 | 10/2009 | Nakajima | |
| 2009/0296133 A1* | 12/2009 | Kawabushi et al. | 358/1.15 |
| 2010/0250970 A1* | 9/2010 | Ejiri | G06F 21/34 713/193 |
| 2011/0043854 A1* | 2/2011 | Sakikawa | G06F 3/1207 358/1.15 |
| 2011/0149315 A1* | 6/2011 | Yamazaki | H04N 1/0044 358/1.9 |
| 2012/0081734 A1* | 4/2012 | Ikeda | 358/1.14 |
| 2013/0063749 A1* | 3/2013 | Ohisa et al. | 358/1.13 |
| 2013/0100472 A1* | 4/2013 | Kamoi | H04N 1/00347 358/1.13 |
| 2013/0194635 A1* | 8/2013 | Okochi | 358/1.16 |
| 2014/0293361 A1* | 10/2014 | Mori et al. | 358/403 |
| 2014/0333960 A1* | 11/2014 | Fukasawa | 358/1.15 |
| 2014/0368849 A1* | 12/2014 | Kato | H04N 1/00278 358/1.13 |
| 2015/0062637 A1* | 3/2015 | Hara | 358/1.15 |
| 2015/0172487 A1* | 6/2015 | Kirihara | H04N 1/00514 358/1.14 |

* cited by examiner

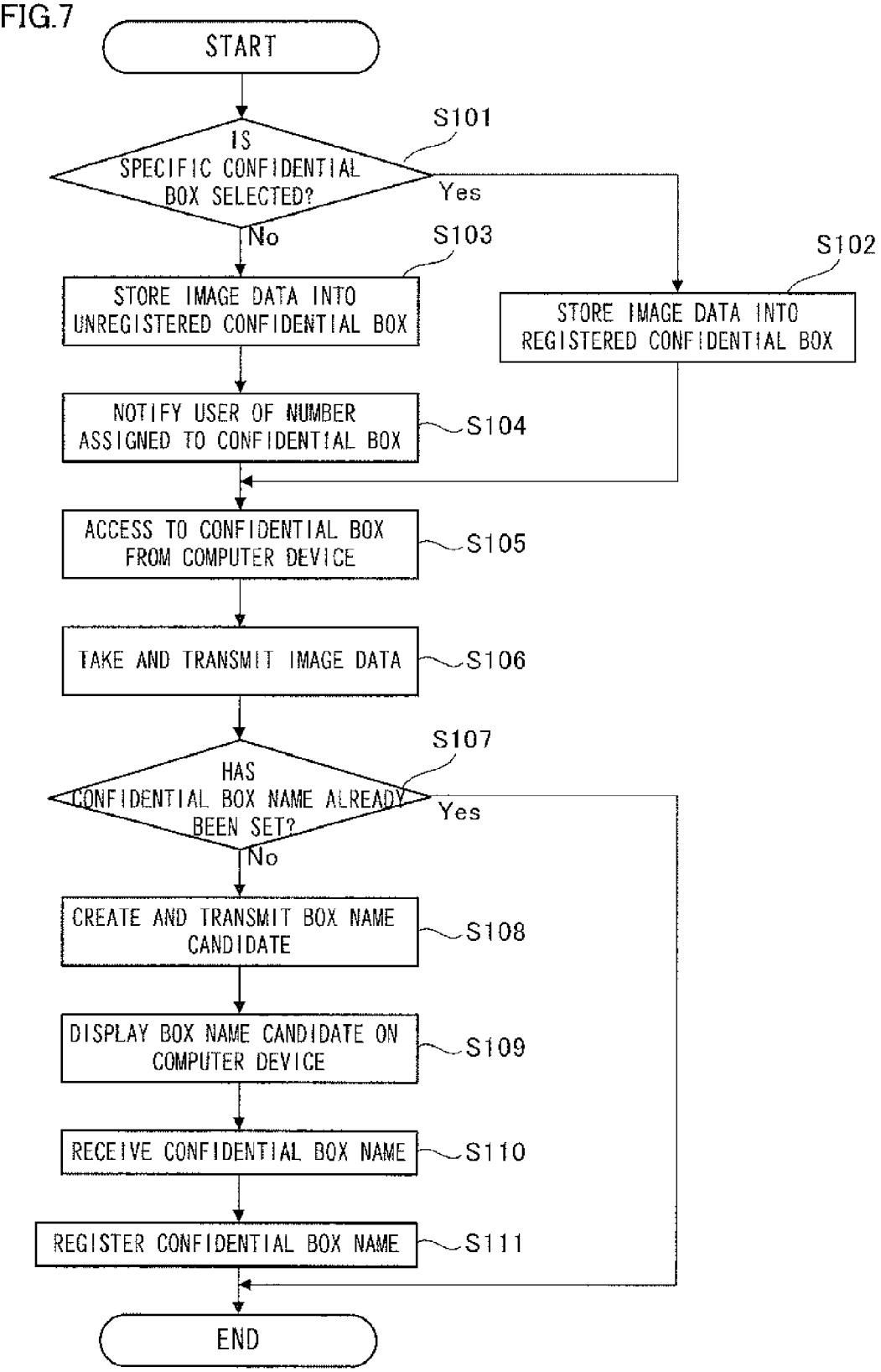

ically embodiment will be described in detail with reference to attached drawings.

IMAGE DATA STORING DEVICE, METHOD OF STORING IMAGE DATA AND NON-TRANSITORY COMPUTER READABLE MEDIUM STORING PROGRAM

CROSS REFERENCE TO RELATED APPLICATION

This application is based on and claims priority under 35 USC §119 from Japanese Patent Application No. 2014-164100 filed Aug. 12, 2014.

BACKGROUND

Technical Field

The present invention relates to an image data storing device, a method of storing image data and a non-transitory computer readable medium storing a program.

Related Art

There are known some image forming apparatuses in which image data is stored in a region with a name that has been assigned thereto.

SUMMARY

According to an aspect of the present invention, there is provided an image data storing device including: an image data obtaining unit that obtains image data; a storing unit that stores the image data obtained by the image data obtaining unit into any one of plural storage regions, to each of which a name is assigned; a reception unit that receives the name of the storage region in which the image data is stored from external equipment, the name being obtained by the external equipment that takes the image data from the storage region, and the name being set by a user; and a memory that stores the name received by the reception unit in association with the storage region.

BRIEF DESCRIPTION OF THE DRAWINGS

An exemplary embodiment of the present invention will be described in detail based on the following figures, wherein:

FIG. 7 is a flowchart showing a flow of processing executed in a case where the selection button for "scanner (box storage)" shown in FIG. 5 is selected by a user;

DETAILED DESCRIPTION

Hereinafter, an exemplary embodiment according to the present invention will be described in detail with reference to attached drawings.

Figure 1:
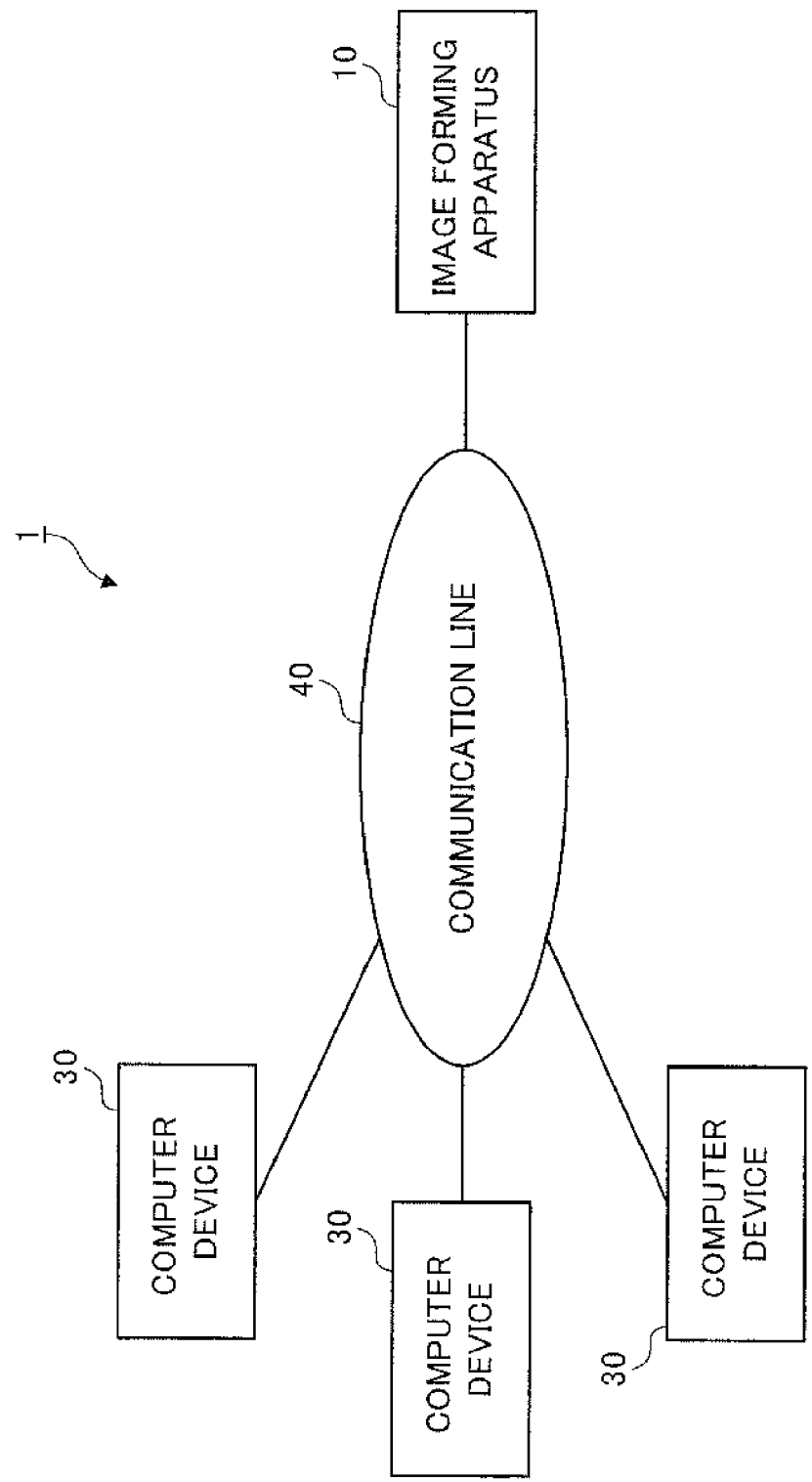
FIG. 1 is a diagram showing an entire configuration of an image reading system related to the exemplary embodiment.

FIG. 1 is a diagram showing an entire configuration of an image reading system 1 related to the exemplary embodiment.

In the image reading system 1 of the exemplary embodiment, an image forming apparatus 10 having an image reading function is provided. The image forming apparatus 10 includes the image reading function, a copying function and a function of forming an image onto a sheet as a recording member. Here, of the image forming apparatus 10, a functional part that performs storage of image data is able to be captured as an image data storing device.

Further, the image reading system 1 is provided with multiple computer devices 30. Here, the image forming apparatus 10 and the multiple computer devices 30 are connected to a communication line 40, and perform communication with each other via the communication line 40.

Figure 2:
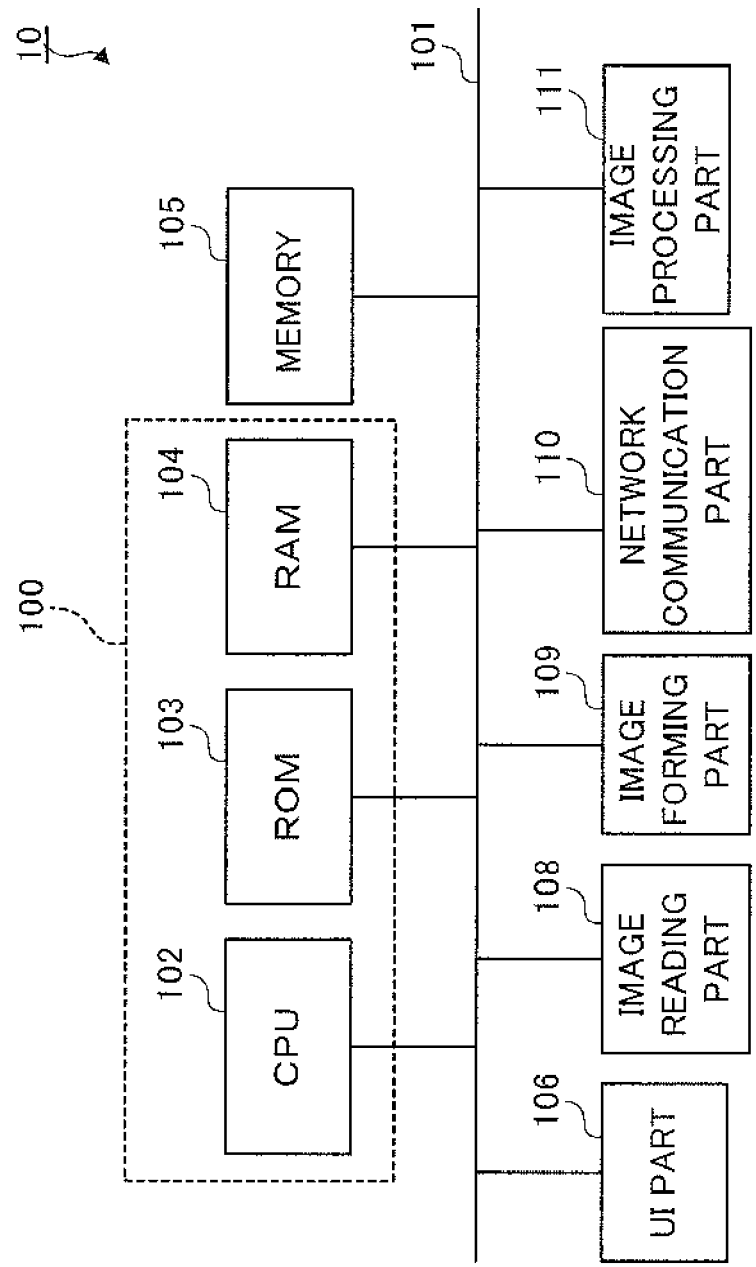
FIG. 2 is a block diagram exemplifying a hardware configuration of an image forming apparatus.

FIG. 2 is a block diagram exemplifying a hardware configuration of the image forming apparatus 10.

As shown in the figure, each part of the image forming apparatus 10 is connected to a bus 101, and performs data transmission and reception via the bus 101.

A UI (User Interface) part 106 includes a not-shown monitor and performs display of information to a user. In addition, the UI part 106 performs acceptance of information inputted by a user. The UI part 106 is configured with, for example, a monitor of a touch panel system that outputs a control signal corresponding to a pressed position.

An image reading part 108 as an example of an image data obtaining unit is configured with a so-called scanning device and reads an image formed on a document (original) set by a user, to thereby create (obtain) image data. It should be noted that the created image data is outputted to, for example, an image processing part 111.

An image forming part 109 forms a toner image corresponding to the image data onto a recording member, such as a sheet, by use of, for example, an electrophotographic system. It should be noted that an image may be formed by use of an ink jet system, not limited to the electrophotographic system.

A network communication part 110 functions as a communication interface that performs communication with the computer devices 30 connected to the communication line 40.

The image processing part 111 executes image processing, such as color correction or tone correction, on inputted image data. The image data that has been subjected to image processing by the image processing part 111 is outputted to a memory 105 or the image forming part 109.

The memory 105 is configured with a storing device, such as a hard disk device, and stores, for example, image data received by the network communication part 110 or image data created by the image reading part 108.

A controller 100 is provided with a CPU (Central Processing Unit) 102, a ROM (Read Only Memory) 103 and a RAM (Random Access Memory) 104. The ROM 103 stores a control program executed by the CPU 102. The CPU 102 reads the control program stored in the ROM 103 and executes the control program using the RAM 104 as a work area. When the control program is executed by the CPU 102, each part of the image forming apparatus 10 is controlled, and thereby the image forming apparatus 10 performs image formation onto a sheet or reading an image on a document.

It should be noted that, as a supply mode related to the control program, there is a mode in which the control program is supplied in a state of being stored in the ROM 103 in advance and loaded into the RAM 104. Further, in a case where a rewritable ROM 103, such as an EEPROM, is provided, there is a mode in which, after the CPU 102 is set, only the program is installed onto the ROM 103, and then loaded into the RAM 104. Moreover, there is also a mode in which the control program is transmitted via a network, such as the Internet, then installed onto the ROM 103, and further, loaded into the RAM 104. Still further, there is a mode in which the control program is loaded into the RAM 104 from an external storage medium, such as a DVD-ROM or a flash memory.

Figure 3:
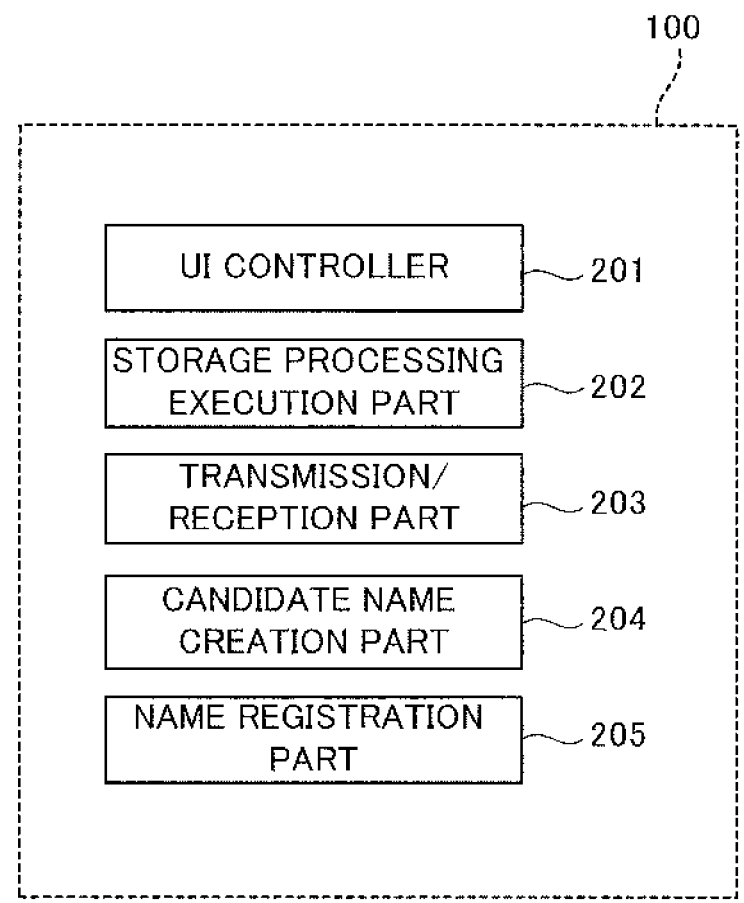
FIG. 3 is a functional block diagram showing functions implemented by a controller of the image forming apparatus.

FIG. 3 is a functional block diagram showing functions implemented by the controller 100 of the image forming apparatus 10. It should be noted that, in FIG. 3, only the functional blocks related to image reading are shown.

In the exemplary embodiment, the CPU 102 executes the control program stored in the ROM 103, and accordingly, the function of each of a UI controller 201, a storage processing execution part 202, a transmission/reception part 203, a candidate name creation part 204 and a name registration part 205 is implemented.

Here, the UI controller 201 performs display control of the UI part 106. Moreover, the UI controller 201 obtains the information inputted by a user via the UI part 106.

The storage processing execution part 202 as an example of a storing unit executes storage processing of image data into a confidential box, which will be described later, as an example of a storage region. To be more specific, the storage processing execution part 202 executes the storage processing of image data into the memory 105. On this occasion, the storage processing execution part 202 executes the storage processing of image data into the memory 105 after associating a confidential box name provided to each confidential box (to be described later) with image data.

The transmission/reception part 203 performs transmission and reception of information with the computer devices 30. To be specific, the transmission/reception part 203 transmits image data stored in the confidential box to the computer devices 30. In addition, the transmission/reception part 203 receives a confidential box name selected by a user from the computer device 30 (detailed description thereof will be given later). Further, the transmission/reception part 203 receives a number assigned to the confidential box (hereinafter, referred to as a "confidential box number") from the computer device 30.

The candidate name creation part 204 as an example of a name candidate creation unit creates a candidate of the confidential box name (hereinafter, referred to as "box name candidate"). It should be noted that plural box name candidates are created. Moreover, the created box name candidates are transmitted to the computer device 30 by the transmission/reception part 203 that functions as a transmission unit.

The name registration part 205 associates the confidential box name transmitted from the computer device 30, which is a confidential box name selected (set) by a user, with a confidential box, and then stores the confidential box name into the memory 105 (registers the confidential box name with the memory 105).

Figure 4:
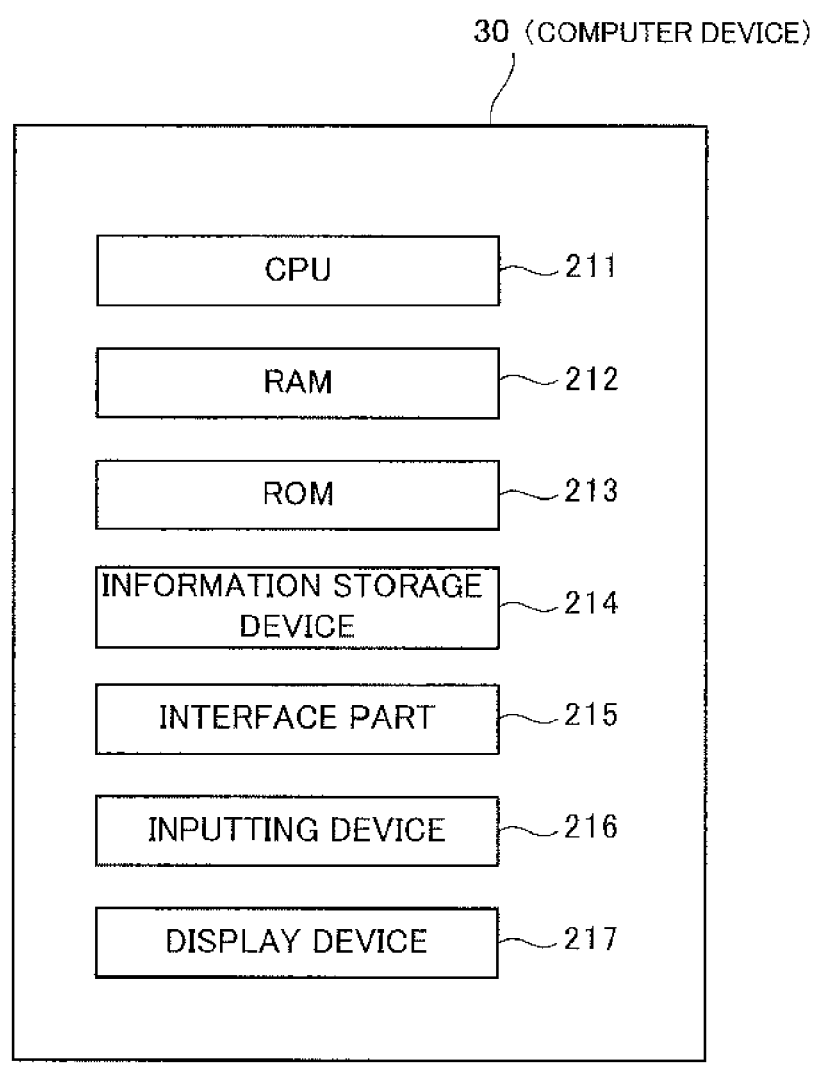
FIG. 4 is a block diagram exemplifying a hardware configuration of a computer device.

FIG. 4 is a block diagram exemplifying a hardware configuration of the computer device 30.

The computer device 30 as an example of external equipment is provided with a CPU 211 that executes computational processing in accordance with a predetermined processing program, a RAM 212 used as a working memory of the CPU 211 and a ROM 213 that stores processing programs, various set values and the like used in processing by the CPU 211.

Moreover, the computer device 30 is provided with an information storage device 214 configured with a hard disk device or the like and an interface (I/F) part 215 that controls input and output of signals with the external equipment. The computer device 30 is further provided with an inputting device 216 that is configured with a keyboard, a mouse and the like, to thereby input information from a user to the computer device 30. In addition, the computer device 30 is provided with a display device 217 configured with a liquid crystal monitor or the like.

Here, in the computer device 30, the CPU 211 reads the control program stored in the ROM 213 and executes the control program using the RAM 212 as a work area.

It should be noted that, as a supply mode related to the processing program, similar to the above description, there is a mode in which the processing program is supplied in a state of being stored in the ROM 213 in advance and loaded into the RAM 212. Further, in a case where a rewritable ROM 213, such as an EEPROM, is provided, there is a mode in which, after the CPU 211 is set, only the program is installed onto the ROM 213, and then loaded into the RAM 212. Moreover, there is also a mode in which the program is transmitted via a network, such as the Internet, then installed onto the ROM 213, and further, loaded into the RAM 212. Still further, there is a mode in which the processing program is loaded into the RAM 212 from an external storage medium, such as a DVD-ROM or a flash memory.

Figure 5:
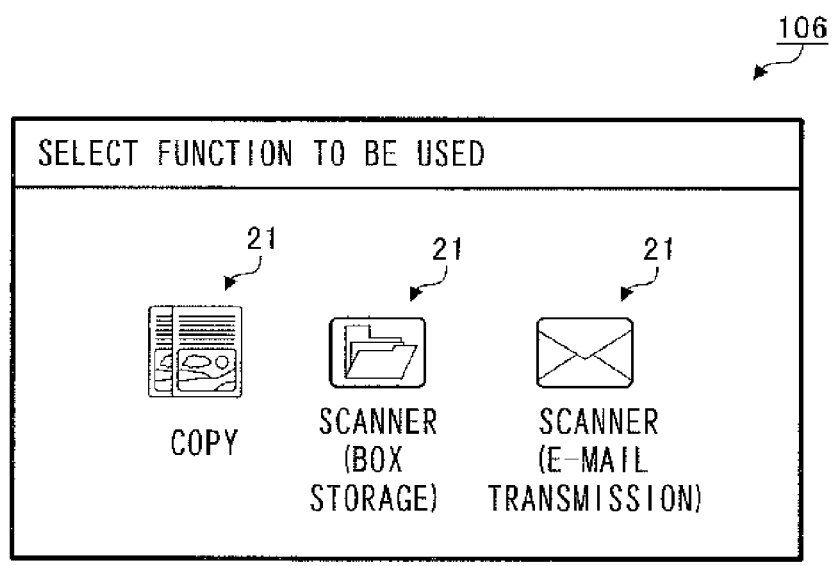
FIG. 5 is a diagram showing a display example in a UI part provided to the image forming apparatus.

FIG. 5 is a diagram showing a display example in the UI part 106 provided to the image forming apparatus 10.

In the exemplary embodiment, as shown in FIG. 5, plural selection buttons 21, with which selection by a user is performed, are displayed in the UI part 106. To be specific, in the example shown in FIG. 5, the selection buttons 21 for selecting any of "copy", "scanner (box storage)" and "scanner (e-mail transmission)" are displayed.

Then, in the exemplary embodiment, when any of the selection buttons 21 is selected by a user, a process associated with the selected selection button 21 is executed.

It should be noted that "copy" refers to a process in which an image on a document is read by the image reading part 108 to create image data, and then the image forming part 109 performs image formation onto a sheet by use of the image data.

Moreover, "scanner (box storage)" refers to a process in which an image on a document is read by the image reading part 108 to create image data, and then the image data is stored in a confidential box prepared for each user. The image data stored in the confidential box will be transmitted to the computer device 30 as required by the user at a later stage.

Moreover, "scanner (e-mail transmission)" refers to a process in which an image on a document is read by the image reading part 108 to create image data, and then the image data is transmitted by e-mail transmission to a predetermined transmission destination.

Figure 6:
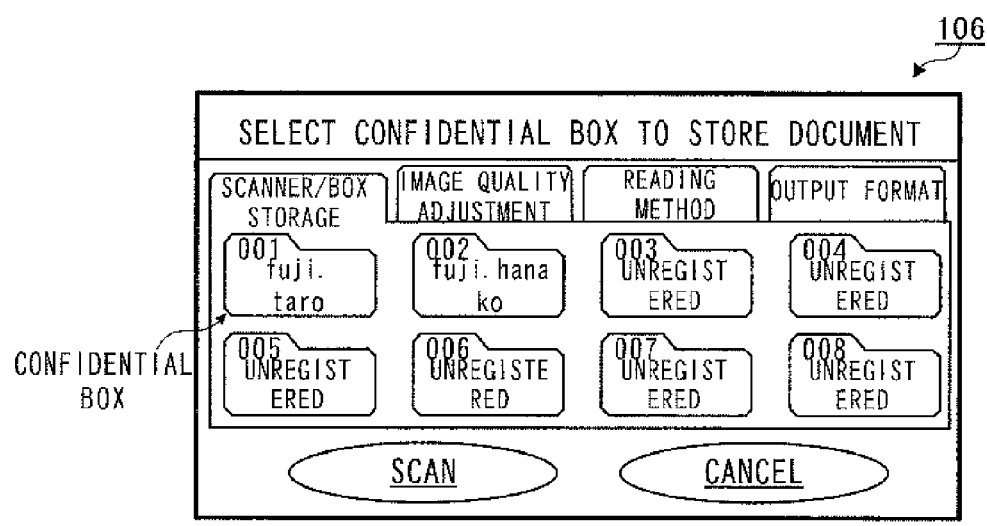
FIG. 6 is a diagram showing the UI part after a selection button for "scanner (box storage)" shown in FIG. 5 is selected.

FIG. 6 is a diagram showing the UI part 106 after the selection button 21 for "scanner (box storage)" shown in FIG. 5 is selected.

In the image forming apparatus 10 of the exemplary embodiment, it is possible to register a confidential box, which is a storage destination of image data, for each user. A user who has already registered a confidential box stores image data obtained by image reading into the confidential box of his/her own. Here, FIG. 6 exemplifies a case where a confidential box of a user named "fuji.taro" and a confidential box of a user named "fuji.hanako" have already been registered.

FIG. 7 is a flowchart showing a flow of processing executed in the case where the selection button 21 for "scanner (box storage)" shown in FIG. 5 is selected by a user.

In the case where the selection button 21 for "scanner (box storage)" is selected by a user, first, as shown in step 101, the UI controller 201 determines whether or not a specific confidential box is selected. To be specific, it is determined whether or not a confidential box whose name has already been registered (hereinafter, referred to as "registered confidential box"), as the confidential box named "fuji.taro" or the confidential box named "fuji.hanako" shown in FIG. 6, is selected.

Thereafter, "scan" button shown in FIG. 6 is pressed by a user, then, image reading of a document set onto the image reading part 108 is carried out, and accordingly, image data is created. Then, the image data is stored into the confidential box by the storage processing execution part 202. On this occasion, if it is determined in step 101 that the registered confidential box is selected, the image data is stored into the registered confidential box (step 102).

On the other hand, in a case where it is not determined in step 101 that the registered confidential box (specific confidential box) is selected, the storage processing execution part 202 stores the image data into a confidential box other than the registered confidential box (hereinafter, the confidential box will be referred to as "unregistered confidential box") (step 103). To be specific, for example, the image data is stored into an unregistered confidential box displayed as "003 unregistered" in FIG. 6.

Next, the UI controller 201 notifies the user of the number assigned to the unregistered confidential box, into which the image data has been stored, via the UI part 106 (step 104). To be specific, for example, in the case where the image data is stored in the unregistered confidential box of "003 unregistered", the number "003" is notified to the user via the UI part 106.

To describe additionally, the number "003" functions as identifying information for discriminating the confidential box from other confidential boxes. In the exemplary embodiment, in the case where image data is stored in an unregistered confidential box, the UI controller 201 that functions as a notification unit notifies a user of this identifying information.

Next, in the exemplary embodiment, the computer device 30 is operated by a user, to thereby make access to the confidential box in the image forming apparatus 10 from the computer device 30 (step 105). Thereafter, in the exemplary embodiment, the storage processing execution part 202 takes the image data out of the confidential box (accessed confidential box), and the transmission/reception part 203 transmits the image data to the computer device 30 (the computer device 30 that has made access to the confidential box) (step 106).

It should be noted that the access from the computer device 30 to the confidential box in the image forming apparatus 10 is made, for example, via a web UI in the computer device 30. To describe additionally, user's operation is performed on a web browser in the computer device 30, and access to the confidential box in the image forming apparatus 10 is made via the web browser.

Moreover, when access to the confidential box is made, if the user has his/her own confidential box (registered confidential box), information for identifying his/her own confidential box, such as the above-described "fuji.taro" or "fuji.hanako", is inputted on the computer device 30, to thereby make access to the confidential box.

On the other hand, in the case of making access to the unregistered confidential box, a number, such as the above-described "003", is inputted on the computer device 30, to thereby make access to the confidential box.

Processing in step 107 and steps subsequent thereto will be described.

In step 107, the candidate name creation part 204 determines whether or not a confidential box name has already been set (registered) with respect to the confidential box from which the image data is taken. Then, if the confidential box name has already been set, such as the above-described "fuji.taro" or "fuji.hanako", processing is finished.

On the other hand, if it is determined in step 107 that the confidential box name has not yet been set, the candidate name creation part 204 creates box name candidates, which are candidates of the confidential box name, and then, the transmission/reception part 203 transmits the created box name candidates to the computer device 30 (step 108).

Here, to create the box name candidates, first, information of the above-described computer device 30, which has taken the image data out of the confidential box, is obtained. Then, in the exemplary embodiment, the box name candidates are created based on the information of the computer device 30.

Thereafter, in the exemplary embodiment, the box name candidates are transmitted to the computer device 30, and then displayed on the display device 217 of the computer device 30. To additionally describe, on the display device 217 of the computer device 30, a screen for promoting a user to carry out setting (inputting) about the confidential box is displayed.

To describe further, in the exemplary embodiment, when a user takes image data from a confidential box via the computer device 30, the transmission/reception part 203 that functions as the transmission unit transmits information to the computer device 30, which causes a screen for prompting to carry out setting (inputting) about the confidential box to be displayed on the computer device 30.

To be specific, for example, image information of a screen for prompting setting of a confidential box is transmitted. Moreover, for example, in a case where image information for prompting setting of a confidential box is stored in advance, the transmission/reception part 203 transmits an instruction to start displaying a screen based on the image information to the computer device 30.

Processing in step 109 and steps subsequent thereto will be described.

When the box name candidates are transmitted to the computer device 30 in the above-described step 108, the box name candidates are displayed on the computer device 30 (step 109). Then, on the computer device 30, a confidential box name is selected from the box name candidates by a user. Next, the selected confidential box name is transmitted from the computer device 30 to the image forming apparatus 10, and the transmission/reception part 203 of the image forming apparatus 10, which functions as a reception unit, receives the confidential box name (step 110).

Next, in the image forming apparatus 10, the name registration part 205 associates the unregistered confidential box, from which the image data is taken in step 106, with the confidential box name received in the above-described step 110. To be more specific, the unregistered confidential box, from which the image data is taken in step 106, is associated with the confidential box name received in step 110, and thereafter, the confidential box name is stored (registered) in the memory 105 (step 111).

Consequently, in the exemplary embodiment, the memory 105 that functions as a memory stores the confidential box name and the confidential box in a state of being associated with each other. In this case, from this time, the confidential box with a name of a user who has taken the image data in step 106 is displayed on the UI part 106.

FIGS. 8A and 8B and FIGS. 9A and 9B are diagrams showing the display screen displayed on the UI part 106 or the like of the image forming apparatus 10.

Figure 8A:
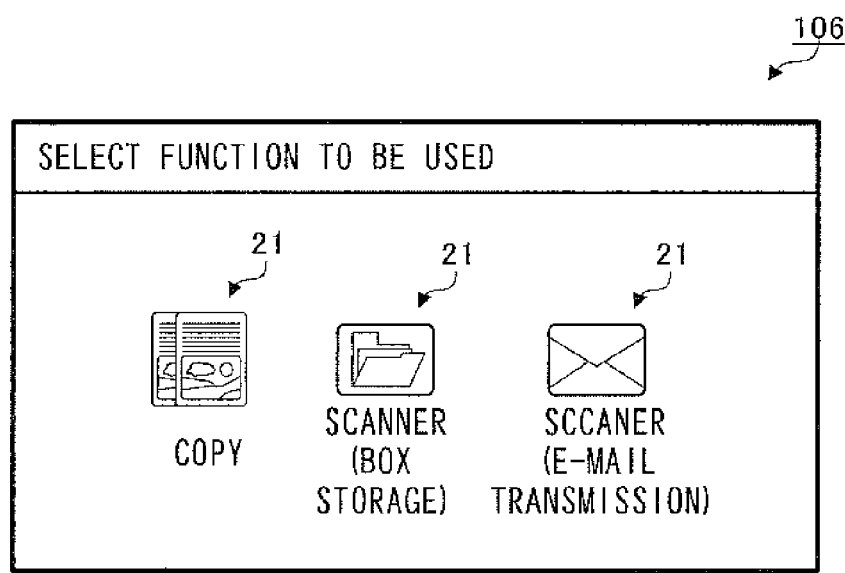
FIGS. 8A and 8B are diagrams showing a display screen displayed on the UI part or the like of the image forming apparatus.

FIG. 8A shows a display screen same as the display screen shown in FIG. 5. In a stand-by state in which operations by a user are not carried out, the display screen shown in FIG. 8A is displayed. In this display screen, as described above, the selection buttons 21 for selecting any of "copy", "scanner (box storage)" and "scanner (e-mail transmission)" are displayed.

Figure 8B:
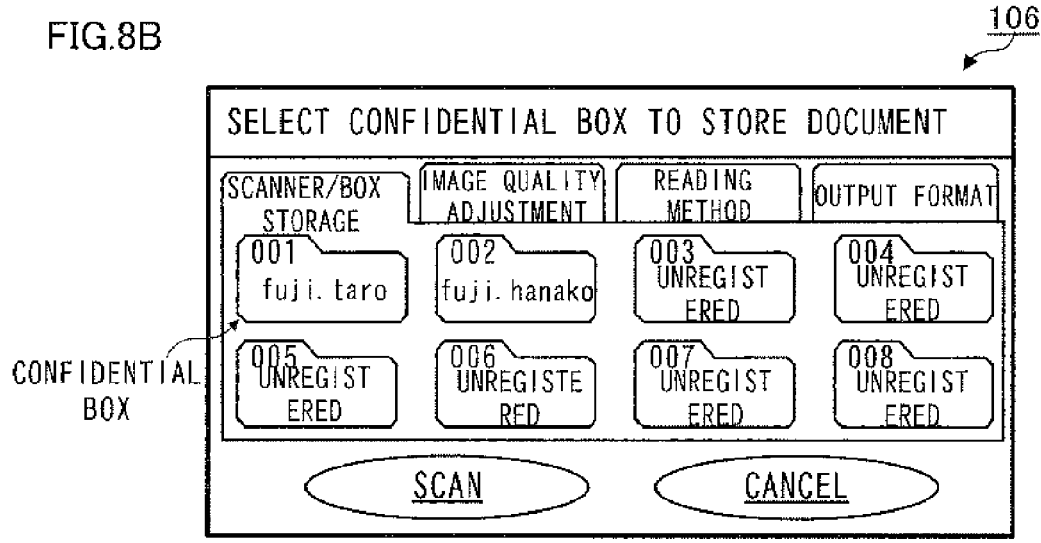

Similar to the display screen shown in FIG. 6, FIG. 8B shows a display screen after the selection button 21 for "scanner (box storage)" is selected.

In this display screen, the registered confidential boxes with which the confidential box names have already been registered, and the unregistered confidential boxes with which confidential box names have not yet been registered are displayed. Further, in a lower portion of the display screen, a "scan" button that is selected by a user when scanning (box storage) is started, and a "cancel" button for canceling the "scan" process are displayed.

Here, in the exemplary embodiment, when image reading is carried out, the user who has any registered confidential box selects his/her own registered confidential box as described above.

Moreover, in the exemplary embodiment, it is possible to perform scanning without selecting any confidential box. The user having no registered confidential box presses the "scan" button without selecting any confidential box. In this case, the image data is stored into an unregistered confidential box as described above.

Figure 9A:
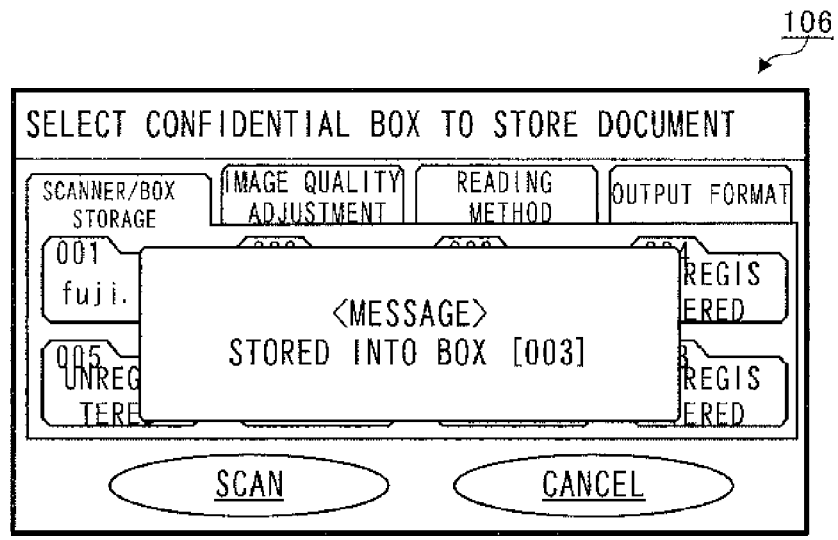
FIGS. 9A and 9B are other diagrams showing a display screen displayed on the UI part or the like of the image forming apparatus.

FIG. 9A shows a display screen after the image data is stored into an unregistered confidential box. In the case where the image data is stored into the unregistered confidential box, the number assigned to the box into which the image data is stored is notified to the user, as shown in the figure. In this example, the case in which the image data is stored into the confidential box of "003" is exemplified.

Figure 9B:
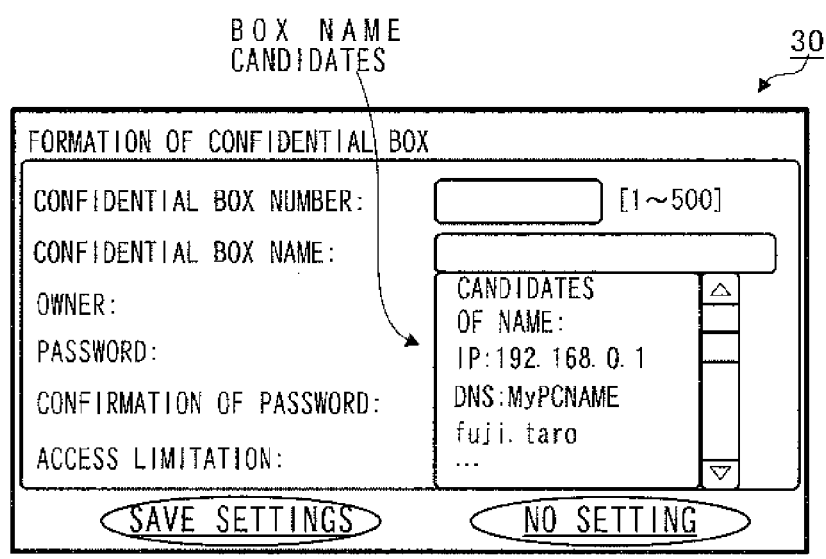

FIG. 9B is a diagram showing box name candidates displayed on (the display device 217 of) the computer device 30. In the exemplary embodiment, as described in the above step 109, plural box name candidates are displayed on the display device 217 of the computer device 30, and the user selects a confidential box name from the plural box name candidates.

Here, in the exemplary embodiment, the plural box name candidates are displayed in a pull-down form as shown in FIG. 9B.

Here, the candidate name creation part 204 of the exemplary embodiment creates the box name candidates based on information (information such as "PC name", "DNS name", "IP address" and "account name") obtained from the computer device 30 that is operated by the user (the computer device 30 having made access to the confidential box in the above-described step 105). Here, FIG. 9B exemplifies a case in which the box name candidates are created based on an IP address (192.168.0.1), a DNS name (MyPCNAME) and an account name (fuji.taro).

Then, in the exemplary embodiment, the user selects a confidential box name from the plural box name candidates displayed on the computer device 30. When a confidential box name is selected, the confidential box name is transmitted to the image forming apparatus 10, and registered with the image forming apparatus 10.

Here, in a case where image data of a scanned document is saved to the image forming apparatus 10, in general, one's own confidential box is opened in the image forming apparatus 10, and the image data is stored into the confidential box. By the way, usually, in an initial state of the image forming apparatus 10, a confidential box corresponding to each user is not opened, and accordingly, a user is required to open his/her own confidential box by operating the UI part 106 of the image forming apparatus 10.

Incidentally, the UI part 106 provided in the image forming apparatus 10 has small display region (input screen), and therefore, creation of a confidential box by operating the UI part 106 needs a lot of effort.

On the other hand, in the configuration of the exemplary embodiment, creation of the confidential box (setting (inputting) of the confidential box name) is performed by the computer device 30, not by the UI part 106. This reduces the effort required to create the confidential box in the exemplary embodiment. Further, in the exemplary embodiment, candidates of the confidential box are automatically created, and the user selects the confidential box name from the candidates. This further reduces the effort required to create the confidential box.

Further, in the exemplary embodiment, even if the user's own confidential box is not created (selection of the confidential box is not performed), image data is stored into a confidential box (unregistered confidential box).

To additionally describe, in the exemplary embodiment, even in the case where a user does not have his/her own confidential box (selection of the confidential box is not performed), image reading is started by pressing the "scan" button shown in FIG. 6 by the user. Then, the image data obtained by image reading is stored into a confidential box. Accordingly, in the exemplary embodiment, the time required to start image reading is shortened, as compared to a case where it is necessary to create a confidential box in advance.

To describe further, in the image forming apparatus 10 in recent years, a card reader for reading an ID card or the like is provided, and in some cases, the image forming apparatus 10 obtains a user ID, to thereby perform user authentication. With such a configuration, it is possible to obtain information identifying a user, such as a user name, from the ID card, and by use of the identifying information, creation of the confidential box can be simplified. To be specific, for example, by setting the user name obtained from the ID card as the confidential box name, it becomes unnecessary to input the confidential box name via the UI part 106, and accordingly, creation of the confidential box is simplified.

However, with respect to the user who has no ID card, a problem of requiring a lot of effort to create the confidential box still remains. In other words, in the case where the user does not have an ID card, since information, such as a user name, is unavailable from the ID card, the user is required to input information through the UI part 106. Then, in this case, it requires a lot of effort to input information as described above. On the other hand, in the exemplary embodiment, even a user who has no ID card is not required to input information through the UI part 106, and accordingly, operability is improved.

(Others)

In the above description, the box name candidates are offered to the user, and the one selected from the box name candidates by the user becomes the confidential box name. However, it may also be possible that the user directly inputs the confidential box name on the computer device 30, without the offer of the box name candidates, and the inputted confidential box name is registered with the image forming apparatus 10.

Moreover, in the above description, the box name candidates are created based on the information obtained from the computer device 30 used by the user; however, it may also be possible to create the box name candidates based on information obtained from the image forming apparatus 10. To be specific, for example, it may be possible to set the confidential box name that has already been stored in the image forming apparatus 10 as the box name candidate, and to display the confidential box name on the computer device 30. In this case, the above-described "fuji.taro" and "fuji.hanako" are displayed as the confidential box names on the computer device 30.

Here, depending on a certain user, there is a possibility that, even though a confidential box name has already been registered, the user forgets about the registration. In the case where the confidential box name that has already been stored in the image forming apparatus 10 is displayed as a box name candidate as described above, whether or not the confidential box name of his/her own has already been registered is notified to the user.

Moreover, depending on a certain user, it is assumed that a confidential box name added with a number, for example "2", such as "fuji.taro2" or "fuji.hanako2" is created. However, in such a case, if the confidential box name having already been stored in the image forming apparatus 10 is displayed as the box name candidate, the user is not required to input all of the characters constituting the confidential box name from the beginning, but is only required to input the part "2" additionally. In this case, user's effort in inputting the box name is reduced.

Moreover, in the above description, the case in which the box name candidates are created by the image forming apparatus 10 is taken as an example. However, it may be possible to store a program (program for creating the box name candidates), such as a scanner driver, in the computer device 30 in advance, and to create the box name candidates by the computer device 30.

In addition, in the exemplary embodiment, if scanning is executed in a state where a registered confidential box is not selected, a number assigned to an unregistered confidential box is notified to the user as shown in FIG. 9A. However, it may be possible that a password, such as a four-digit number, may be notified in addition to the number assigned to the unregistered confidential box. In this case, it may also be possible to cause the user to input the password into the computer device 30, and to transmit image data in the confidential box to the computer device 30 if the inputted password coincides with the above-described password that has been notified.

Moreover, in the exemplary embodiment, the case in which, if a user has not yet formed his/her own confidential box yet, image data is stored into an unregistered confidential box that has not been used is taken as an example, as described above. However, it may be possible to form a new confidential box, which is not an unregistered confidential box, and to store the image data into the new confidential box.

Further, in the above description, the case in which the computer device 30 is configured with a so-called personal computer is taken as an example. However, the computer device 30 includes a so-called tablet or the like.

Moreover, in the above description, the processing in which image data obtained by scanning is stored into the confidential box is taken as an example; however, the above-described processing may be applied to a case in which image data obtained by processing other than scanning is stored into the confidential box. To be specific, the above-described processing may be applied when image data obtained by fax reception is stored into the confidential box.

To describe more specifically, some image forming apparatuses 10 have fax transmission/reception function. In a case where the image forming apparatus 10 obtain image data by fax reception, similar to the above description, the image data is stored into an unregistered confidential box that has not been used, or a new confidential box is formed and the image data is stored into the new confidential box.

Then, in the case where the image data obtained by fax reception is stored into the unregistered confidential box or the new confidential box, fax reception is notified (alerted) to, for example, a machine administrator, by e-mail or the like. On that occasion, the number assigned to the confidential box in which the image data is stored or a URL to access the confidential box may be described in the notification.

Then, in this case, in accordance with the notification, the machine administrator makes access to the unregistered confidential box or the new confidential box via the computer device 30, to thereby take the image data (fax document) therefrom. Further, on this occasion, the machine administrator performs input (selection) of a name of the confidential box, in which the image data has been stored, on the computer device 30. Then, similar to the above description, the name is associated with the confidential box.

It should be noted that, similar to the above description, the candidates of the name may be notified to the machine administrator, and in this case, for example, a phone number of the facsimile transmission source is notified as the candidate. Moreover, for example, if the phone number of the facsimile transmission source has already been registered in an address book possessed by the image forming apparatus 10, the name of the transmitting person or the like, which is stored in association with the phone number, is notified as the candidate.

Moreover, in the above description, the processing in which the candidates of the name are offered in the computer device 30 is taken as an example; however, another processing in which further option, such as "name is not assigned", is offered may be performed. In this case, if the option "name is not assigned" is selected, and further, the image data is taken from the confidential box, the confidential box is deleted or is reset to an unused state. In detail, in the case where the new confidential box has been formed, the new confidential box is deleted, and in the case where the image data is stored in the unregistered confidential box that has not been used, the unregistered confidential box is reset to the unused state.

Execution of such processing prevents the number of the confidential boxes from becoming enormous. Here, for example, if processing of sequentially forming new confidential boxes is uniformly executed, the number of the confidential boxes is increased, and then, when a user is to select his/her own confidential box on the UI part 106 of the image forming apparatus 10, the user has difficulty in finding his/her own confidential box. Further, depending on circumstances, the machine administrator deletes unused confidential boxes; however, if the number of the confidential boxes is too large, workload of the machine administrator is increased.

On the other hand, in the case where the above-described processing of deleting the confidential box or resetting the confidential box to the unused state is performed, the number of the confidential boxes is prevented from becoming enormous. To additionally describe, if the option "name is not assigned" is selected, it is determined that the confidential box is temporarily used, and after the document is taken out, the confidential box is deleted or is reset to the unused state. In such a case, increase of the confidential boxes to an excessive number is suppressed, and it becomes less difficult for the user to find his/her own confidential box. Further, the workload of the machine administrator who deletes the confidential box is reduced.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data storing device comprising:
   at least one hardware processor configured to implement:
   an image data obtaining unit that obtains image data;
   an authentication unit that authenticates a user;
   a storing unit that stores the image data obtained by the image data obtaining unit into any one of a plurality of storage regions, to each of which a name is assigned;
   a reception unit that receives the name of the storage region in which the image data is stored from external equipment, the name being obtained by the external equipment that takes the image data from the storage region, and the name being set by the user; and
   a name candidate creation unit that creates a candidate of the name to be set by the user when the authentication unit does not authenticate the user;
   a memory that stores the name received by the reception unit in association with the storage region; and
   a transmission unit that transmits the candidate of the name created by the name candidate creation unit to the external equipment.

2. The image data storing device according to claim 1, wherein, even in a state in which any of the plurality of storage regions is not selected by a user, the image data obtained by the image data obtaining unit is stored into any one of the plurality of storage regions.

3. The image data storing device according to claim 2, wherein the at least one hardware processor is further configured to implement:
   a notification unit that notifies the user of identifying information in a case where the image data obtained by the image data obtaining unit is stored into any one of the plurality of storage regions in a state in which the storage region is not selected by the user, the identifying information identifying the storage region into which the image data is stored.

4. The image data storing device according to claim 3, wherein the at least one hardware processor is further configured to implement:
   a transmission unit that transmits information to the external equipment when the user takes the image data from the storage region via the external equipment,
   wherein the information causes a screen for prompting the user to set the name to be displayed on the external equipment.

5. The image data storing device according to claim 2 wherein the at least one hardware processor is further configured to implement:
   a transmission unit that transmits information to the external equipment when the user takes the image data from the storage region via the external equipment,
   wherein the information causes a screen for prompting the user to set the name to be displayed on the external equipment.

6. The image data storing device according to claim 1, wherein the at least one hardware processor is further configured to implement:
   a transmission unit that transmits information to the external equipment when the user takes the image data from the storage region via the external equipment,
   wherein the information causes a screen for prompting the user to set the name to be displayed on the external equipment.

7. A non-transitory computer readable medium storing a program that causes a computer to execute a process comprising:
   storing image data into any one of a plurality of storage regions, to each of which a name is assigned;
   receiving the name of the storage region in which the image data is stored from external equipment, the name being obtained by the external equipment that takes the image data from the storage region, and the name being set by a user;
   associating the received name with the storage region, and then storing the name in a memory;
   creating a candidate of the name to be set by the user when the user is not authenticated; and
   transmitting the candidate of the name created by the creating to the external equipment.

* * * * *